(12) United States Patent
Hörmann et al.

(10) Patent No.: US 12,098,582 B2
(45) Date of Patent: Sep. 24, 2024

(54) METHOD FOR DETERMINING A POSITION OF A DOOR IN A DOOR SYSTEM

(71) Applicant: MARANTEC ANTRIEBS- UND STEUERUNGSTECHNIK GMBH & CO. KG, Marienfeld (DE)

(72) Inventors: Michael Hörmann, Halle / Westfalen (DE); Marc Hornschuh, Melle (DE); Marc Hellweg, Bielefeld (DE)

(73) Assignee: MARANTEC ANTRIEBS-UND STEUERUNGSTECHNIK GMBH & CO. KG, Marienfeld (DE)

( * ) Notice: Subject to any disclaimer, the term of this patent is extended or adjusted under 35 U.S.C. 154(b) by 39 days.

(21) Appl. No.: 17/638,418

(22) PCT Filed: Aug. 27, 2019

(86) PCT No.: PCT/EP2019/072855
§ 371 (c)(1),
(2) Date: Feb. 25, 2022

(87) PCT Pub. No.: WO2021/037345
PCT Pub. Date: Mar. 4, 2021

(65) Prior Publication Data
US 2022/0316254 A1 Oct. 6, 2022

(51) Int. Cl.
*E05F 15/43* (2015.01)
*G01V 8/20* (2006.01)

(52) U.S. Cl.
CPC ............... *E05F 15/43* (2015.01); *G01V 8/20* (2013.01); *E05F 2015/436* (2015.01); *E05Y 2400/44* (2013.01); *E05Y 2900/106* (2013.01)

(58) Field of Classification Search
CPC . E05F 15/40; E05F 15/43; E05F 15/44; E05F 15/46; E05F 2015/434; E05F 2015/435
See application file for complete search history.

(56) References Cited

U.S. PATENT DOCUMENTS

| 6,167,991 | B1 * | 1/2001 | Full ........................ G01V 8/20 |
| | | | 49/25 |
| 6,218,940 | B1 | 4/2001 | Rejc et al. |
| 6,388,412 | B1 * | 5/2002 | Reed ...................... E06B 9/68 |
| | | | 318/266 |
| 10,204,466 | B1 * | 2/2019 | Rothmuller ............ E05F 15/43 |
| 2013/0106601 | A1 | 5/2013 | Leutenegger et al. |
| 2016/0281411 | A1 * | 9/2016 | Calagaz, Jr. ........ G05B 19/042 |

(Continued)

FOREIGN PATENT DOCUMENTS

| DE | 102010017398 B3 | 12/2011 |
| DE | 102011102232 A1 | 11/2012 |
| DE | 202014101131 U1 | 3/2014 |

(Continued)

*Primary Examiner* — Gregory J Strimbu
(74) *Attorney, Agent, or Firm* — Dilworth & Barrese, LLP (57) ABSTRACT

A method for determining a position of a door in a door system having a rail guiding a movable door element (50) of the door and a sensor element (10) for detecting movement of the door element along a free movement path of the door element (50), involves detecting a state of the sensor element (10) as the door element is moved to and fro. A door control determines the door changes in the state based on the position of the sensor element (10).

5 Claims, 11 Drawing Sheets

(56) References Cited

U.S. PATENT DOCUMENTS

2019/0264489 A1\* 8/2019 Hörmann .............. E05F 15/668

FOREIGN PATENT DOCUMENTS

| EP | 1653035 A2 | 5/2006 |
| --- | --- | --- |
| EP | 2586959 A1 | 5/2013 |
| EP | 2799384 A1 | 11/2014 |
| JP | H11-182128 A | 7/1999 |
| JP | 2012-247410 A | 12/2012 |

\* cited by examiner

METHOD FOR DETERMINING A POSITION OF A DOOR IN A DOOR SYSTEM

BACKGROUND OF THE INVENTION

The present invention relates to a method of determining the door position of a door system, for example a garage door, an industrial door system, or the like, in which at least one sensor element that is adapted to ensure a free path for the door is used to secure the travel path of the door. A light barrier, a proximity switch, or a mechanical feeler can be used as the sensor element.

The problem is known from the prior art that which position the door is at is no longer exactly clear after a power outage or after a first putting into operation of the door system after resetting the control unit. This information is, however, indispensable for an orderly travel of the door since otherwise damage to the door system can be incurred.

In accordance with the prior art, absolute encoders are currently provided that are connected to the motor traveling the door via an additional transmission. It is further known to be able to save the costs for the additional transmission if an incremental encoder is used so that the rotary movement of the shaft can be directly evaluated.

It is also disadvantageous here, however, that the door position is no longer known to the door control after a power outage. Since these sensors only determine the position by counting the pulses on a movement of the door with respect to the last known position, these sensors require a reference point that can be traveled to in a safe manner and without a further opening of the door.

SUMMARY OF THE INVENTION

It is accordingly the aim of the present invention to simplify the position determination of a door element so that the door is put into a position to determine the exact door position in an automated manner. This can in particular be of advantage on an initialization of the door control such as is necessary after a power outage.

This is done using the method in accordance with the invention.

A method of determining the door position in a door system is described herein. The door system here has a rail for guiding a travelable door element and a sensor element for detecting a free travel path of the door element. The method here comprises the steps of detecting the state of the at least one sensor element that can either be adopted free of the door element or covered by the door element, with the arrangement position of the sensor element corresponding to the door element on a change of state of the sensor element and with a door control fixing the door position on the basis of this information.

It is therefore accordingly possible in accordance with the method in accordance with the invention to use the position of the sensor element for a reference in the position determination of the door or of the lower door edge, as will be shown in the following with reference to an example for the sensor element using a light barrier.

The control unit will detect the state of the light barrier element after a power outage and will decide the direction the door is to be traveled in with reference to the detected state.

If the light barrier element namely outputs a state that indicates a non-interrupted light signal, that is the door does not pass through the light barrier, the position of the door element can be determined by a directed traveling into the light barrier. Since the position of the light barrier is stored in the control unit, a position determination is possible on a state change of the light barrier. Where the lower door edge is exactly located is thereby therefore made known to the control unit. The further traveling of the door can then take place in dependence on the door position based on this information. It is thus possible, for example, that the drive of the door is reduced briefly before a lower door edge touches the ground to minimize the mechanical strains. This naturally applies accordingly to the reaching of the open position of the door since it is also of advantage here to reduce the drive of the door briefly before the reaching of the maximum open position.

It is clear to the skilled person that analog considerations also apply to a different design of the sensor element, for example in the form of a proximity switch or of a mechanical feeler.

In accordance with a further development of the method, when the state of the sensor element is free, the door element is traveled so long in the closing direction until the state of the sensor element changes or, when the state of the sensor element is covered, the door element is traveled in the direction of opening for so long until the state of the sensor element changes and, on a change of the state, the arrangement position of the sensor element corresponds to the door element and a door control fixes the door position on the basis of this information.

A flank signal can thus be generated by a light barrier covered by the door leaf, for example, when the door leaf releases the light barrier. It is also possible, for example, to generate a flank signal when the door leaf is moved into a free light barrier. This point can then be used as a reference point so that a door control can determine the position of the door element, in particular of a lower door edge. The explained system is naturally likewise applicable to every kind of sensor element so that no restrictions for the applicability of the invention result herefrom.

Provision can be made in accordance with a further optional further development that the door system has a first sensor element and a second sensor element, wherein, on a normal closing procedure of the door element, the second sensor element changes its state from free to covered before the first sensor element and, for determining the door position, when the first and second sensor elements are free, the door element is traveled in the closing direction for so long until the state of the second sensor element changes, and/or, when the first and second sensor elements are covered, the door element is traveled in the opening direction for so long until the state of the first sensor element changes and/or, when the first sensor element is free and the second sensor element is covered, the door element is traveled for so long in the closing direction until the state of the first sensor element changes, and/or the door element is traveled for so long in the opening direction until the state of the second sensor element changes.

Provision can preferably be made that the at least one sensor element is a light barrier element, in particular a reflected light barrier or a passage light barrier, a proximity switch, or a mechanical feeler.

The invention is here not restricted by the type of the sensor element, but rather comprises every sensor element that can be used to execute the idea of the invention and that can detect an approach of a door element.

Provision can furthermore be made in accordance with the invention that the at least one door element is the upper edge or lower edge of a door, a guide roller of the door, or an element, in particular a metal sheet or a screw, attached to the door.

The position of the door can here be defined using a plurality of door elements. It is not absolutely necessary to focus on a lower edge of a door since a guide roller or a different element permanently fastened to the door indicates a defined position of the door.

Provision can be made in accordance with an optional further development of the invention that the door position fixed by a state change of the sensor element is used to validate or sense a reference position of the door in a door control.

The method can thus not be used for a mere position detection in accordance with the invention, but rather to validate the door position at a reference position. The control can thus ensure that the desired state of the door calculated by it corresponds to the effective actual state. If this should not be the case, corresponding countermeasures can be initiated so that a deviation from the desired state to the actual state is eliminated. The occasional or periodic checking of the accuracy of the door control decisively contributes to a better door control and to an error elimination.

Provision can furthermore be made in an advantageous manner in accordance with the invention that the detected door position is used for an initialization procedure of a door control, in particular after a power outage of the door control.

The determination of a reference position is in particular necessary when an initialization of the door control is required. The door control is typically aware of the current door position, with this information no longer being known or not being able to be known after a power outage or on the first putting into operation.

The present method is therefore particularly of advantage here since no trained personnel is necessary for the rebooting (or for the initialization) of the door control. The door control acquires knowledge of the actual position of the door and can set the control accordingly by the automatic sensing of the door position at a reference position.

Provision can furthermore be made in accordance with the invention that the state change of the sensor element is repeatedly carried out by a corresponding movement to and fro for a particularly exact determination of the door position and that the plurality of door positions obtained on each state change are used for the determination of the door position. For example, by forming an average value of the obtained plurality of door positions. It is, however, also conceivable that is not an average value that forms the underlying door position, but A more exact door position is thereby obtained so that the door can overall be controlled with greater reliability.

Provision can additionally be made in this respect that the state change of the sensor element is repeatedly carried out by a corresponding moving to and fro, and indeed for different travel speeds of the door, so that the respective state changes have not all been caused at the same speed.

This also produces a better determination of the door position since it is now no longer only determined by means of a specific travel speed, but rather a plurality of travel speeds have been used.

Provision can furthermore be made in accordance with the invention that the plurality of state changes at different travel speeds of the door are stored together with an associated travel speed to generate a database that makes it possible to be able to estimate a downtime of the distance measurement system and to be able to more exactly detect future state changes.

The downtime of the distance measurement system can then be estimated using a corresponding value from the database that corresponds to or comes close to the actual travel speed and can be taken into account in determining the door position. This likewise results in a more exact determination of the door position since the database comprises data with respect to the downtime of the system stored for a plurality of speeds.

BRIEF DESCRIPTION OF THE DRAWINGS

Further features, advantages and details of the invention will be explained with reference to the following description of the Figures. There are shown.

DESCRIPTION OF THE PREFERRED EMBODIMENTS

Figure 1:
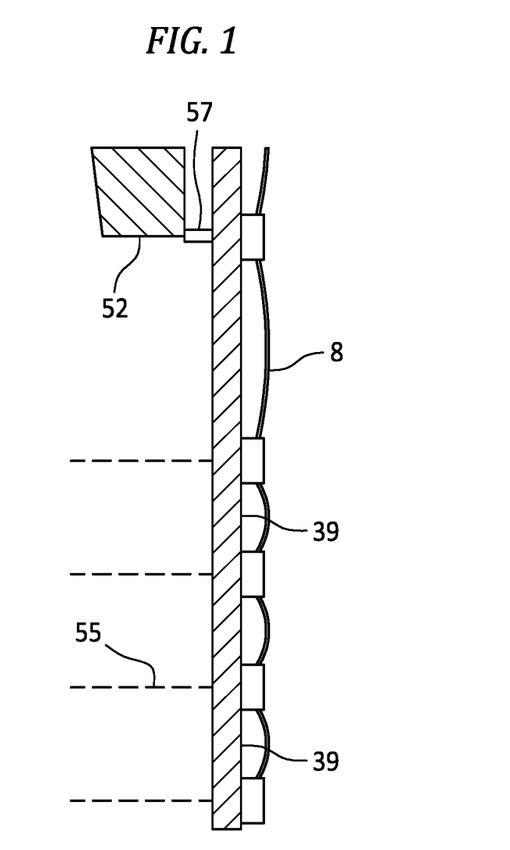
FIG. 1: a partial view of a door system having a rail and a door element guided therein.

FIG. 1 shows a partial view of a door system in accordance with the invention. The door system here has a rail 39 that guides a door segment 50 (also door element) at its left side in the representation of FIG. 1. The guidance of the door segment 50 can here take place in the rail 39 via rollers that are received in a section of the rail 39. A plurality of individual light barrier elements 9 that emit a light beam 55, 57 on the side of the rail 39 facing the door segment 50 are arranged on the side of the rail 39 remote from the door segment 50. The plurality of light barrier elements 9 are here connected to one another by a cable 8 to supply each light barrier element 9 with energy and to provide a data line to a control unit where necessary.

It can be further recognized in FIG. 1 that the lower door edge 52 of the travelable door segment 50 interrupts the light beam 57 emitted by the light barrier element.

If it is now necessary to determine the position of the lower door edge 52 and thus of the travelable door elements, provision can be made in accordance with the method in accordance with the invention to travel the lower door edge such that a state change of a light barrier element takes place.

This state change references the current position to that light barrier element whose state has changed.

It is then possible on the basis of this information to determine the position of the lower door edge 52 and to carry out a traveling of the door in dependence on the actual door position.

Figure 2:
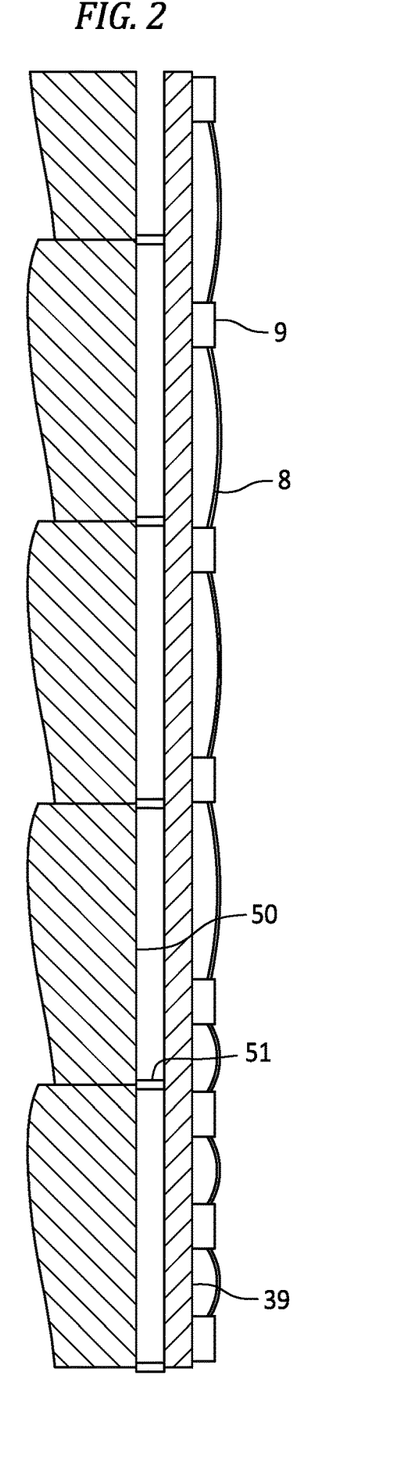
FIG. 2: a partial view of a door system in a closed state.

FIG. 2 shows a further view of the door system. In the representation, the door is in a closed state. The individual door segments 50 interrupt the light signals (not shown) emitted by the plurality of light barrier elements 9. In this respect, the door segments are received in the associated rail 39 by a mounting. A cable 15 can additionally be recognized that connects the light barrier elements to one another.

It is now likewise possible in such a position to determine the door position after a power outage or the like. Since the control unit recognizes that all the light barrier elements 10 transmit a light signal that is interrupted, the door is traveled in the opening direction. In this respect, the state of the bottommost light barrier will change after some time so that the position of the lower door edge can be determined.

It is naturally also possible that the control unit is only aware of the position of one single light barrier element or some few light barrier elements so that the door has to be traveled for so long until such a light barrier element whose position is known to the control unit changes its state.

Figure 3:
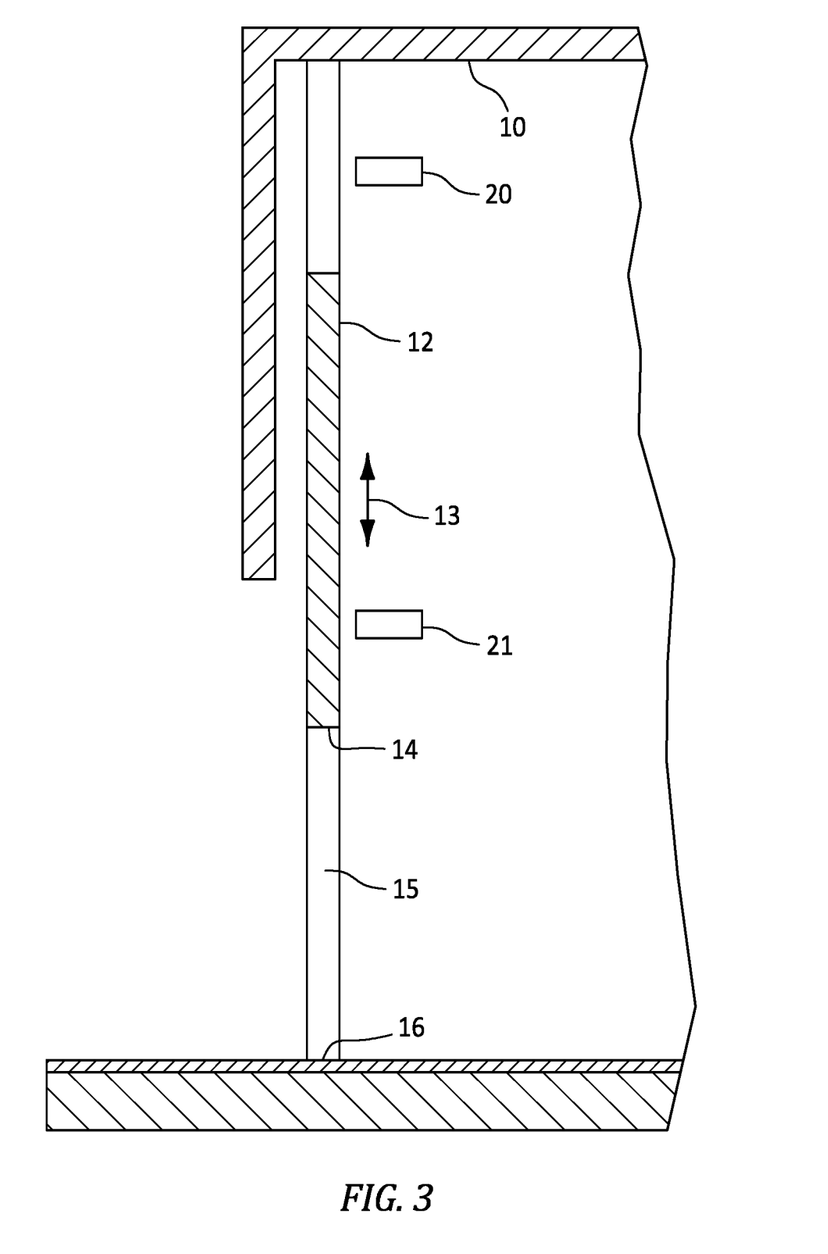
FIG. 3: a cross-sectional view of a second embodiment of the invention.

FIG. 3 shows a cross-sectional view of a door 12 in a building 10 that is operated in accordance with the invention. The control receives the information whether the door 12 is in the zone of the sensor 20, 21 or not via this sensor 20, 21. If the door leaf leaves the zone of the sensor 20, 21 or travels in front of the sensor 20, 21, the sensor signal changes its state accordingly. This flank itself represents a reference point for the sensor 20, 21.

The control knows the direction 13 in which the door 12 has to be traveled to achieve a state change of the sensor signal from the information whether the door leaf is in front of the sensor 20, 21 or not. Since the control knows whether the edge 14 is above or below the sensor 20, 21, there is no risk that mechanical damage occurs to the door 12 by traveling over the top or bottom maximum permitted door position. The door can independently move without any monitoring by trained personnel. If the door position is required for reasons of personal protection, a dead man travel can also be carried out here, with the door 12 then being able to be prevented from traveling in the unsafe direction (downward in the direction of the closed position 16 of the door along the possible travel path 15).

The described application can be implemented independently of the sensor technology used. It could, for example, be a supplementary use of light barriers or light grids that are covered by the door leaf or door. Alternatively all the other sensor types are conceivable that are able to detect the door leaf or the door.

Figure 4:
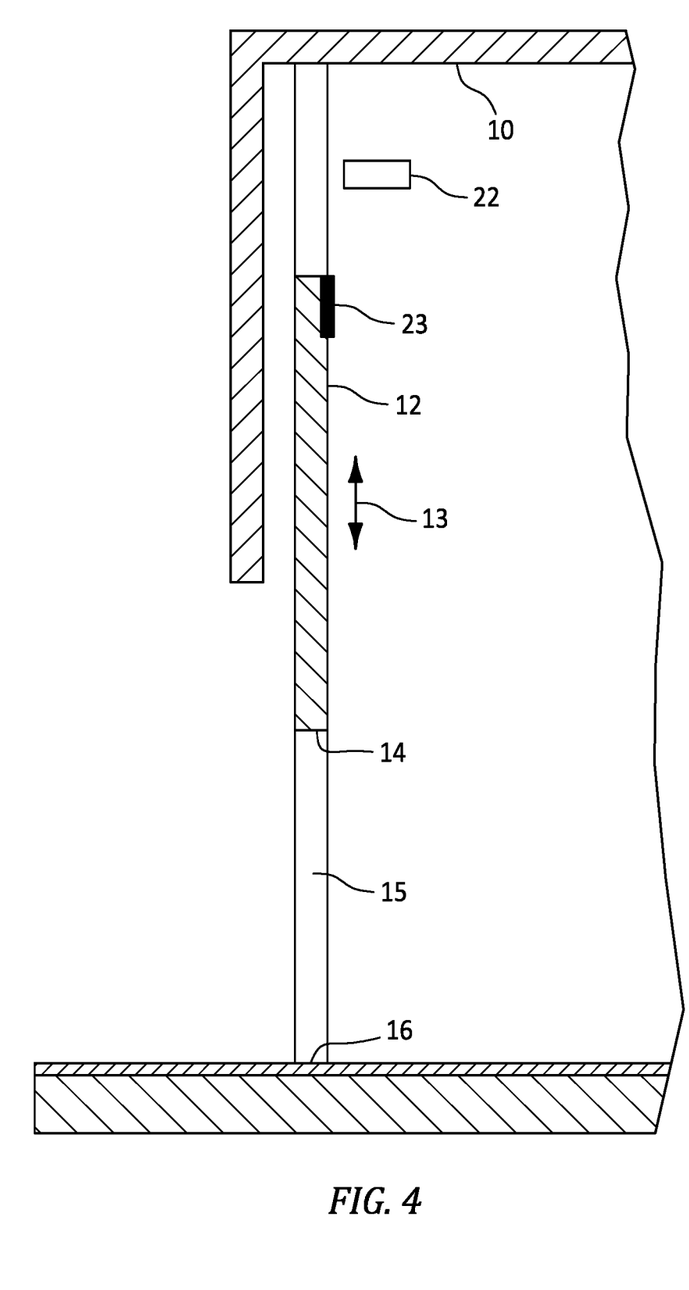
FIG. 4: a cross-sectional view of a modified second embodiment of the invention.

FIG. 4 shows a modification of the preceding Figure in which the sensor 22 is installed with a corresponding sensor surface 23 so that it is activated before reaching the upper mechanically justified end position of the door 12 and also remains activated until at least the reaching of the mechanical end position.

In normal operation, the creeping procedure is initiated at the latest on the activation of the sensor 22 having the sensor surface 23, on the one hand, and referencing and optionally position comparison can also take place there, on the other hand, on the raising of the door.

Figure 5:
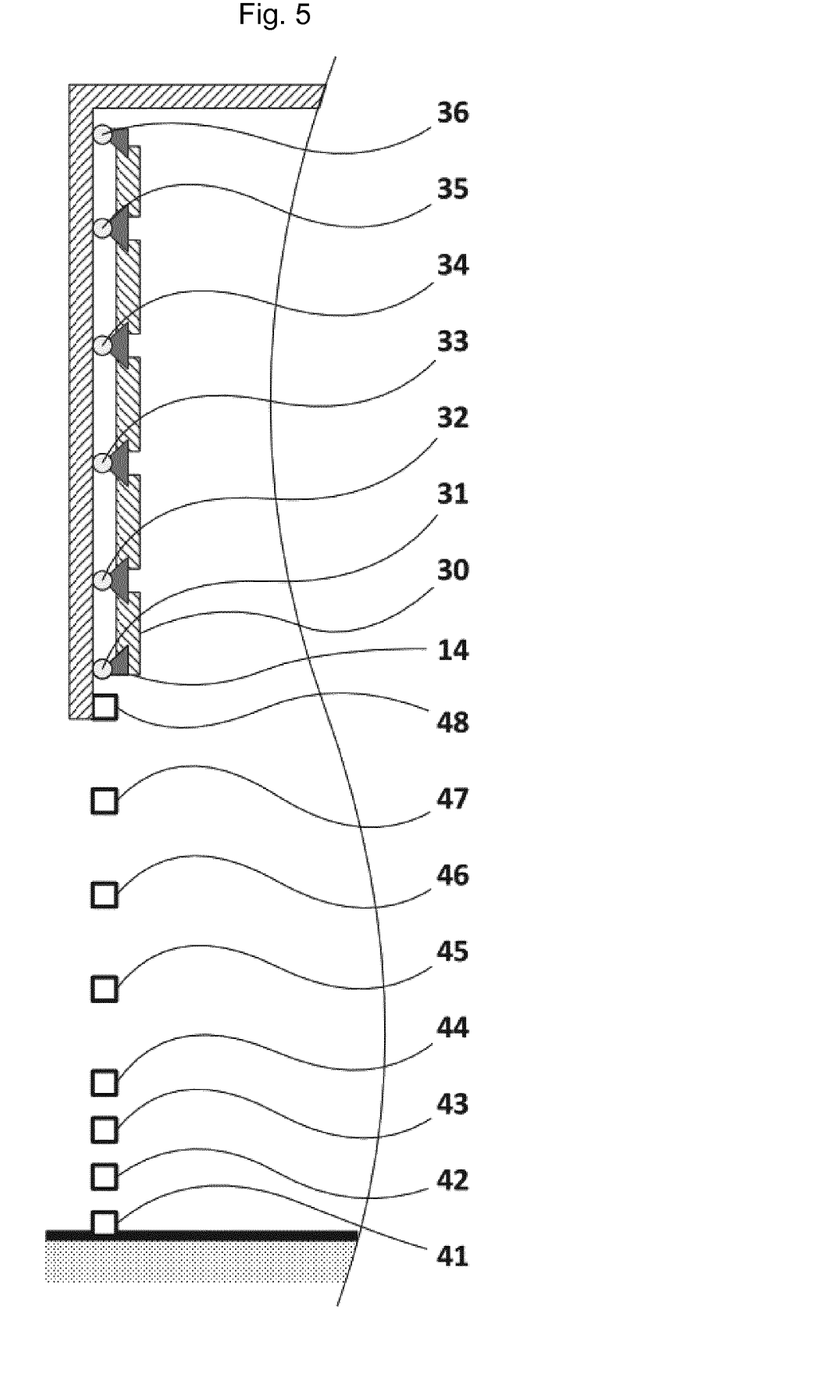
FIG. 5: a cross-sectional view of a third embodiment of the invention.

FIG. 5 discloses a further arrangement that relates to the use with a light grid. The light grid is here introduced in the running path of the door. The rollers 31 to 36 mounted at the door 10 in this process interrupt the light barrier elements 41 to 48 on the closing of the door. In this respect, the arrangement can be selected such that the individual light barrier elements 41 to 48 are interrupted by the rollers; however it is also conceivable that they are interrupted by the holders of the rollers or by the door segments 30 themselves.

Figure 6:
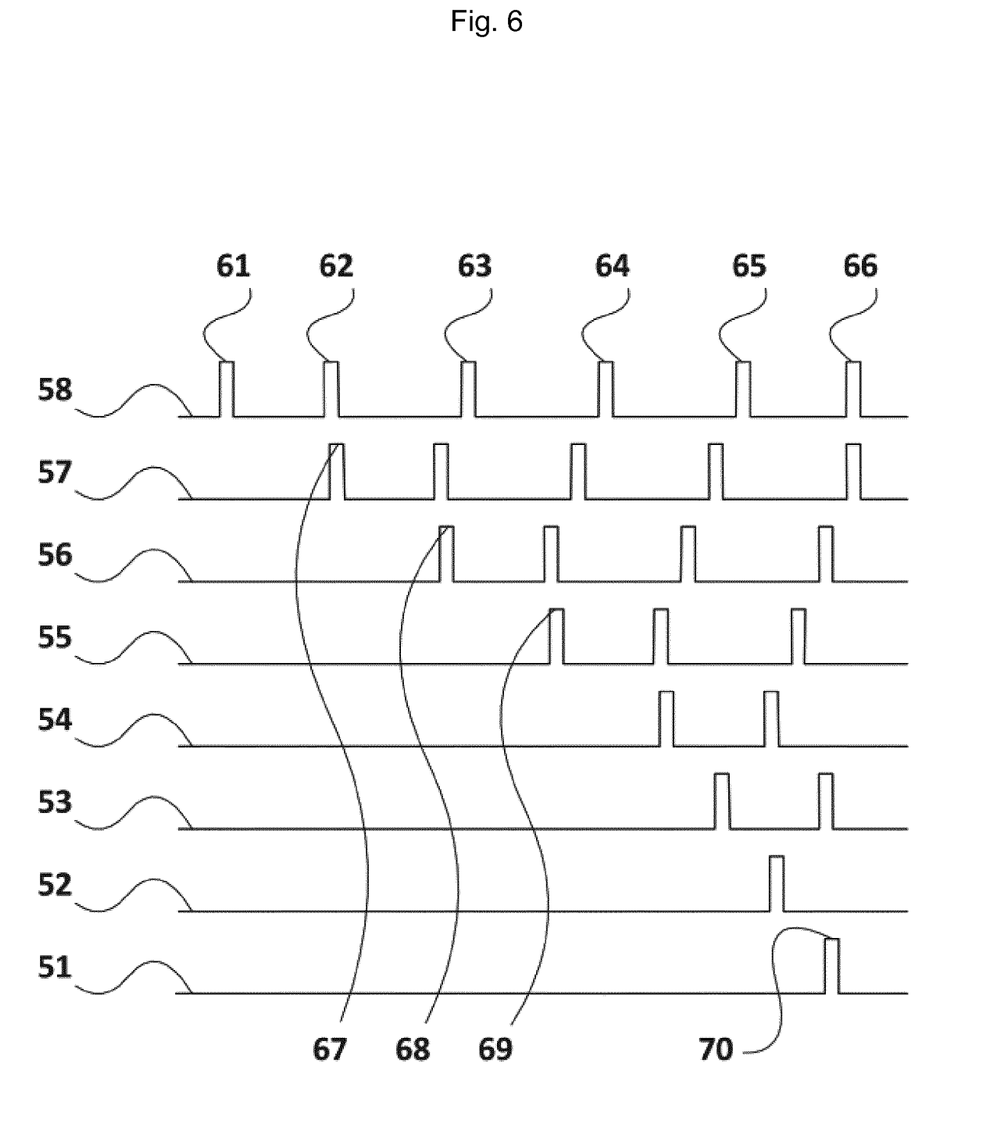
FIG. 6: a signal pattern of the sensor elements in accordance with the third embodiment.

A signal pattern in accordance with FIG. 6 is generated here. The horizontal lines 51 to 58 show the outputs of the light barriers 51 to 58 that are synchronous in time, with the horizontal graph 51 reflecting the signal sequence of the light barrier 41, the graph 52 that of the light barrier 42, etc., up to graph 58 that reflects the signal sequence of the light barrier 48. The signal sequences are shown synchronously in time or distance—depending on the measurement process—so that the signals can be vertically compared at a certain time to or at a certain distance s0.

The first signal 61 is generated by the interruption of the light barrier element 48 by the roller 31; this roller 31 then interrupt the next light barrier element 47 and generates the pulse 62 on the signal track 57. Shortly afterward, the second roller 32 interrupts the first light barrier element 48 and generates the pulse 67 on signal track 57.

The generation of each of the above pulses is recorded exactly with time or distance discretion.

Figure 7:
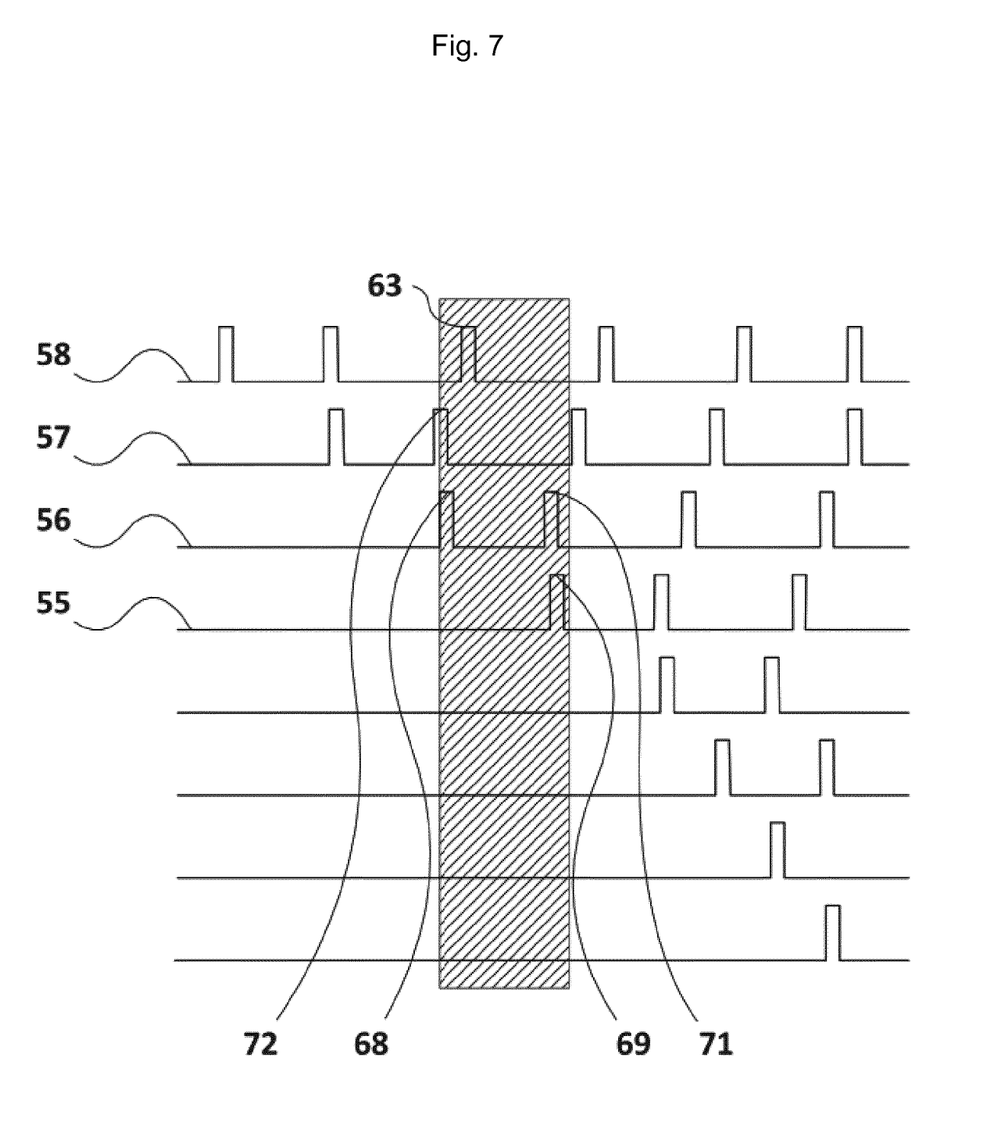
FIG. 7: the representation of a signal pattern and of an inspection zone.

A referencing can now be carried out very exactly with the aid of this recording. For this purpose, the door in an unknown position is slowly moved into the safe upper position. A signal pattern of the hatched zone, such as shown in FIG. 7, is now generated, and indeed from right to left (traveling up). The determination of the lower door edge serves the referencing here. This is hereby implemented in that the tracks 51 to 58 are compared with one another with time discretion and the lowest pulses 69 on the signal sequence are hereby recognized. The roller now generates the pulse 68, now on the signal sequence 56, sometime later or after covering a certain distance. After the traveling over of the pulse, the exact position of the door can be calculated by a comparison with the stored signal sequences and the door can be traveled fast again.

In a further aspect, the pulses 71 (roller 2 at sensor 6), 63, and 72 (roller 2 at sensor 7) recognized between pulses 69 and 68 can likewise be used for validation.

In a further aspect, the exact increase and also the exact drop of the pulse can likewise be used for validation of the position in addition to the state of each pulse.

A multiply safe validation of the door position is achieved by this extension in the present example.

Figure 8:
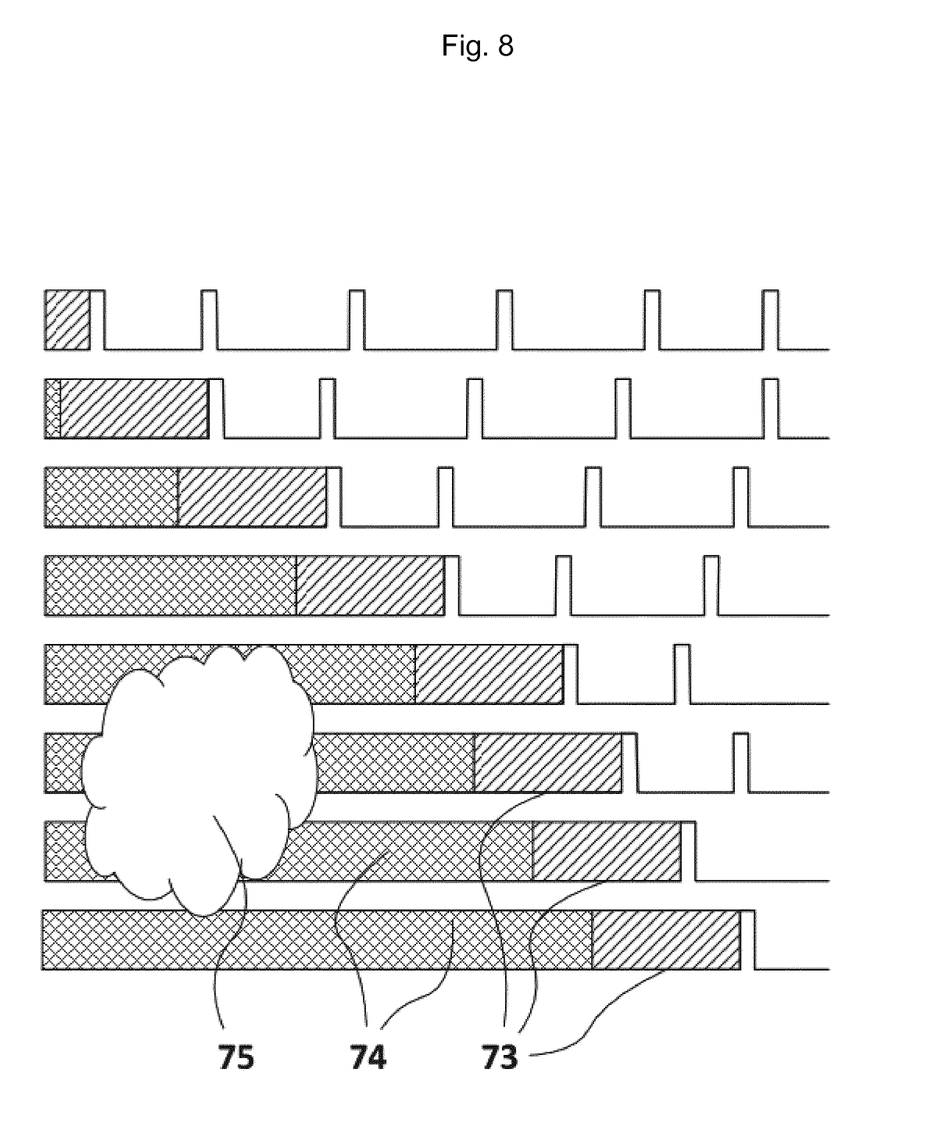
FIG. 8: the representation of a signal pattern with an object present below the door edge.

Since the lower door edge can be calculated validly multiple times using the above process, it can be permitted even with a closing door to tolerate objects 75 in the closing path provided that they move within a tolerance range 74 that lies through the supplement 73 to the calculated lower door edge 14. An example for this is shown in FIG. 8. If the object located beneath the door is therefore sufficiently far away from the lower door edge, this does not necessarily have an influence on the downwardly directed travel speed of the door.

In a further aspect, the speed of the door can be reduced in dependence on the distance from the object 75. This can be carried out, for example, by the lowering to a small speed level or also by a proportional speed reduction up to just before an impact of the lower door edge 14 on the object 75. In a specific application case, the door would, for example, travel down to 100 cm in front of the object 75 at full speed and would lower its speed proportionally more and more until the lower door edge comes to a standstill 10 cm in front of the object, for example. It is clear to the skilled person that the distance values given are to be set in dependence on the type of application and on the design of the door; that is they are not to be interpreted as restrictive for the present invention.

Figure 9:
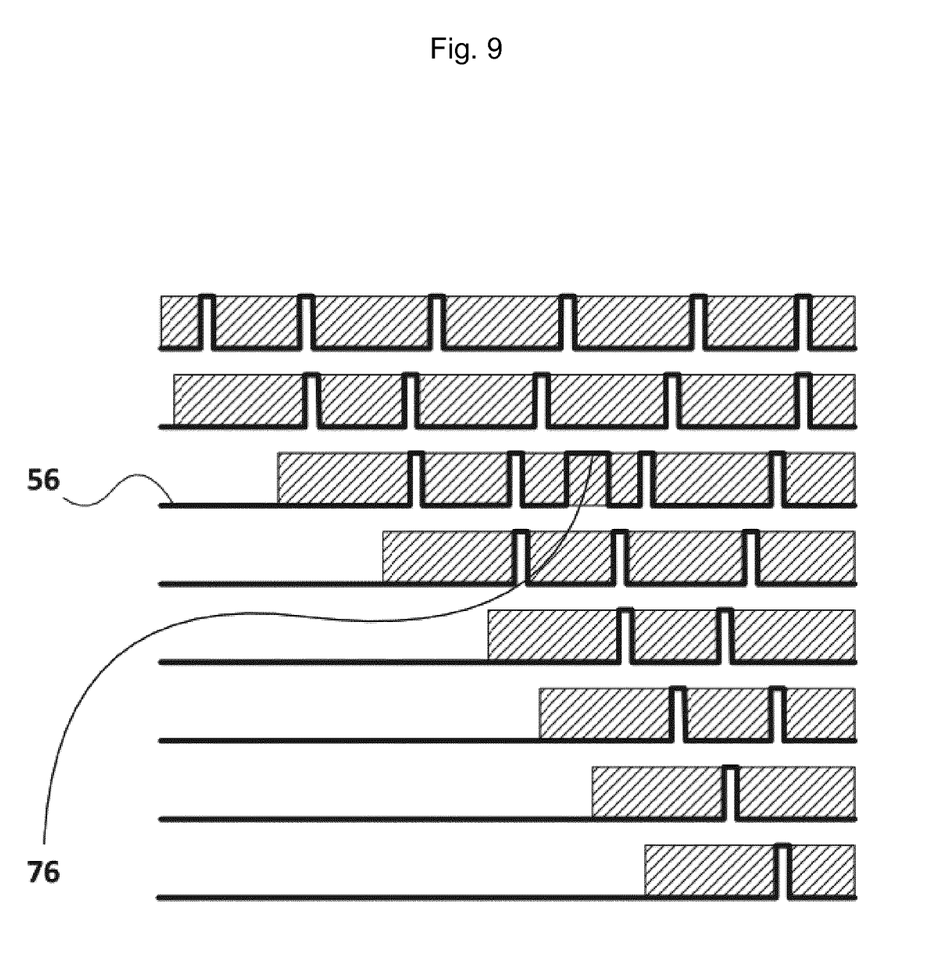
FIG. 9: the representation of a signal pattern with an implausible signal pattern above the lower door edge.

The zone below the lower door edge can likewise also be monitored using this process, as shown in FIG. 9. This is only possible with great difficulty in accordance with the prior art and can be carried out with the proposed method. A check is made for this purpose whether the signal pattern of the individual signal shapes 51 to 58 in front of the lower door edge (as described above) and also behind the lower door edge 14 is plausible. If, for example, as shown in the FIG. 9, an unexpected signal 76 occurs on the signal shape 56, the door is stopped immediately.

Figure 10:
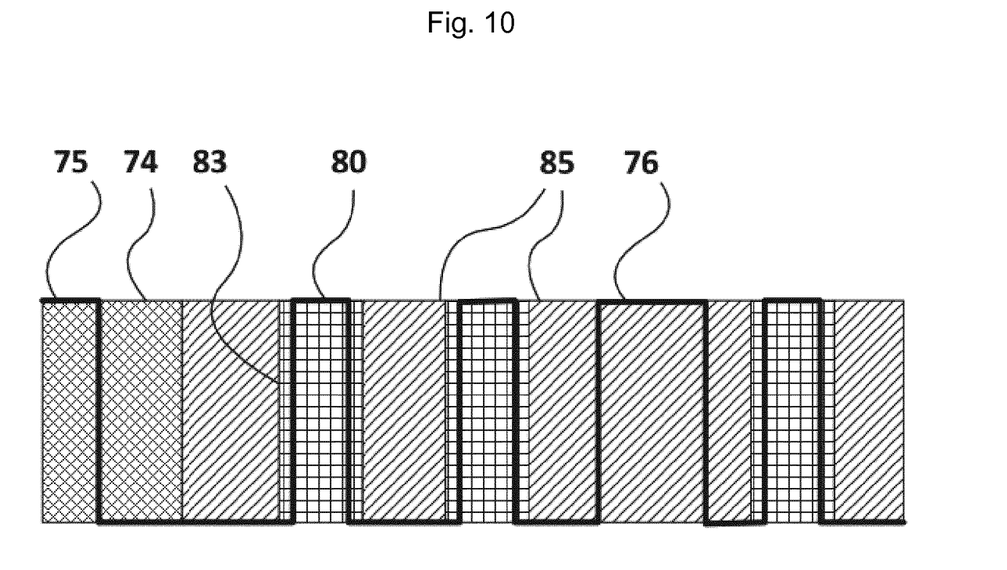
FIG. 10: the representation of a signal sequence of a sensor element with associated tolerance intervals.

FIG. 10 shows a signal sequence of a sensor element. To increase the robustness of the monitoring, a tolerance region 83 is placed around the pulses 80 calculated in advance within which the pulse has to occur. This region may not be too large (otherwise no obstacles can be recognized), but may also not be too small (otherwise disruptions often occur due to measurement inaccuracies). The door drive is immediately stopped in the monitoring zone between the pulses 85 after the discovery of an invalid pulse (that is of an obstacle) 76. Unexpected signals 75 can be tolerated in the zone in front of the door 74.

Figure 11:
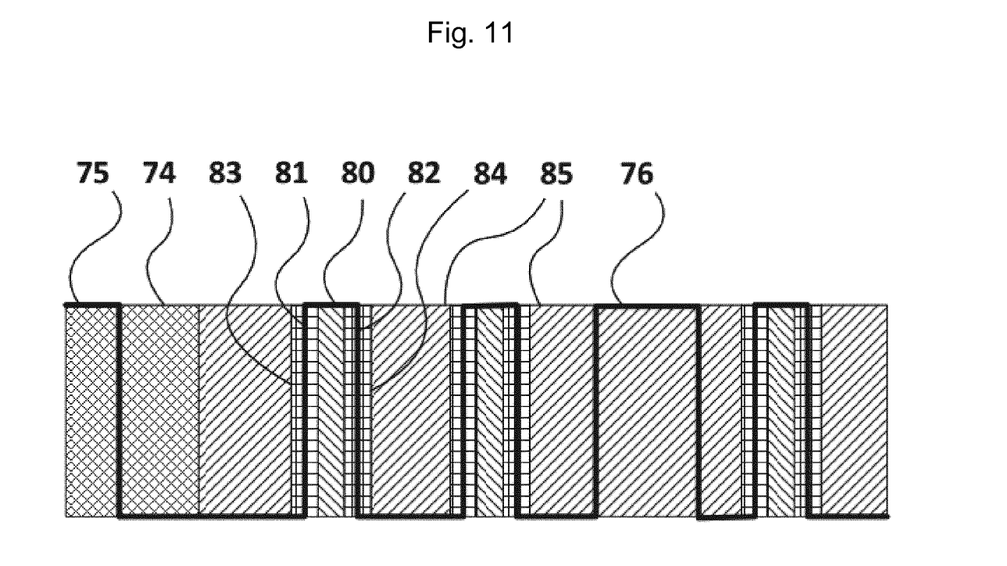
FIG. 11: the representation of a signal sequence of a sensor element with associated tolerance intervals for a minimum width of signals.

In a further aspect, shown in FIG. 11, the zone of the pulses can also be monitored since the pulses would also have to have a certain minimum width. If this is not the case, an error of the sensor has to be assumed that likewise results in an emergency stop. For this purpose, doors 83 and 84 are formed in which the signal shape has to reach the other state from one state.

Figure 12:
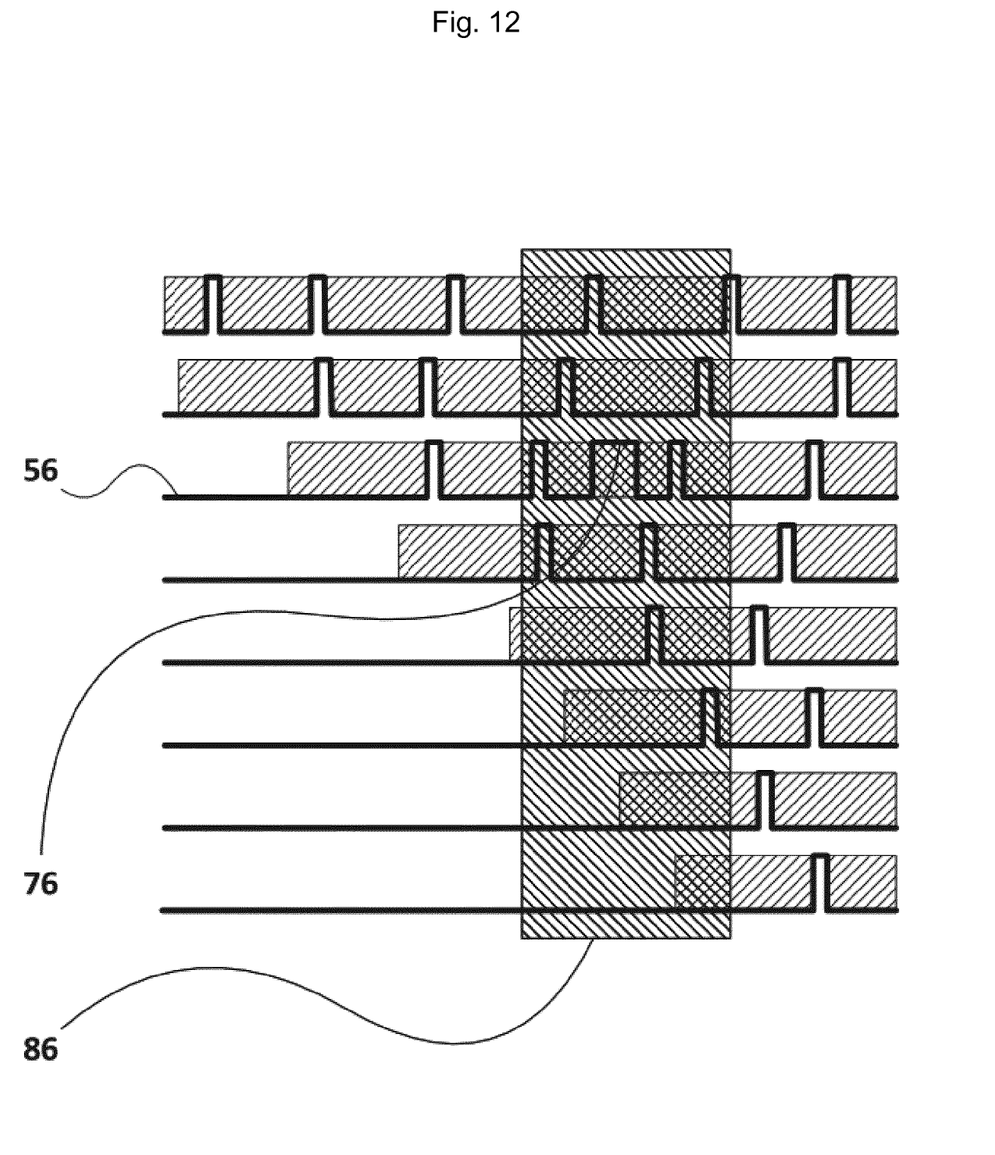
FIG. 12: the representation of a signal pattern on an impact of the door edge with an unexpected obstacle.

In the embodiment shown in FIG. 12, at least one monitored zone is defined after the door edge 86 in which unexpected pulses 76 that are triggered by an obstacle result in an emergency shutdown of the door drive.

A robust operation can hereby be implemented, on the one hand; on the other hand, a monitoring can hereby take place at dangerous trapping positions while no danger can emanate from other positions.

The total invention can be implemented with both time and distance discretion. A sufficiently exact distance meter (for example, an incremental encoder or a pulse generator) is required for an implementation with distance discretion. In cost-sensitive applications, this work can also be implemented by a timer with compromises in accuracy.

The first reference table is determined on the putting into operation and is stored in a non-volatile manner in the memory of the control. The outputs of the light barriers do not necessarily have to be "High" on a darkening as in the example; the signal shape can also be negated.

REFERENCE NUMERAL LIST (8) cable
(9) light barrier element
(10) building
(12) total door
(13) travel direction of the door
(14) lower door edge
(15) possible travel path of the door
(16) floor of the building
(20) sensor, top
(21) sensor, bottom
(22) active surface for the sensor
(23) activation surface for the sensor 22
(30) lower door section
(31) roller 1
(32) roller 2
(33) roller 3
(34) roller 4
(35) roller 5
(36) roller 6
(41) sensor 1
(42) sensor 2
(43) sensor 3
(44) sensor 4
(45) sensor 5
(46) sensor 6
(47) sensor 7
(48) sensor 8
(51) signal sequence of sensor 1
(52) signal sequence of sensor 2
(53) signal sequence of sensor 3
(54) signal sequence of sensor 4
(55) signal sequence of sensor 5
(56) signal sequence of sensor 6
(57) signal sequence of sensor 7
(58) signal sequence of sensor 8
(61) signal of roller 1 on signal sequence 58 of sensor 8
(62) signal of roller 2 on signal sequence 58 of sensor 8
(63) signal of roller 3 on signal sequence 58 of sensor 8
(64) signal of roller 4 on signal sequence 58 of sensor 8
(65) signal of roller 5 on signal sequence 58 of sensor 8
(66) signal of roller 6 on signal sequence 58 of sensor 8
(67) signal of roller 1 on signal sequence 57 of sensor 7
(68) signal of roller 2 on signal sequence 56 of sensor 6
(69) signal of roller 3 on signal sequence 55 of sensor 5
(70) signal of roller 4 on signal sequence 54 of sensor 4
(71) signal of roller 2 on signal sequence 56 of sensor 6
(72) signal of roller 2 on signal sequence 57 of sensor 7
(73) blocking zone in front of the lower door edge
(74) acceptance zone in front of the lower door edge
(75) obstacle in the travel zone
(76) obstacle above the lower door edge
(80) pulse 1 calculated in advance
(81) tolerance range of pulse 1, rising flank
(82) falling flank of pulse 1
(83) tolerance range for pulse 1
(84) tolerance range of pulse 1, rising flank
(85) monitored zone
(86) monitored zone after the door edge

The invention claimed is:

1. A method of calibrating a door control unit to determine a position of a movable door element (50) in a door system having a rail (39) for guiding the movable door element (50) and a sensor element (9) positioned for detecting the position of the door element (50) along a free travel path of the door element (50) between opened and closed positions of the door element (50), comprising the steps of:
    detecting a state of the sensor element (9) by determining if the sensor element (9) is uncovered or covered by the door element (50),
    moving the door element (50) to and fro at different travel speeds of the door element (50) to repeatedly change the state of the sensor element (9) to determine a plurality of calibration positions of the door element (50) based on the repeated changes of the state of the sensor element (9),
    using an average value of the door element (50) calibration positions to determine the door element (50) position,
    and storing the changes of the state of the sensor element (9) at the different travel speeds of the door element (50) together with the different travel speeds of the door element (50), to generate a database to estimate a latency of the sensor element (9) while determining the position of the door element (50) and.

2. A method in accordance with claim 1, wherein the sensor element is a light barrier element, a proximity switch, or a mechanical feeler.

3. A method in accordance with claim 2, wherein the light barrier element is a reflected light barrier or a passage light barrier.

4. A method in accordance with claim 1, wherein the door element (50) is an upper portion or a lower portion of a door, a guide roller of the door or an element attached to the door.

5. A method in accordance with claim 4, wherein the door element is a metal sheet or a screw.

* * * * *